R. STAR.
APPARATUS FOR INDICATING THE SPEED OF SHIPS.
APPLICATION FILED AUG. 7, 1916.
1,239,978.
Patented Sept. 11, 1917.
3 SHEETS—SHEET 1.
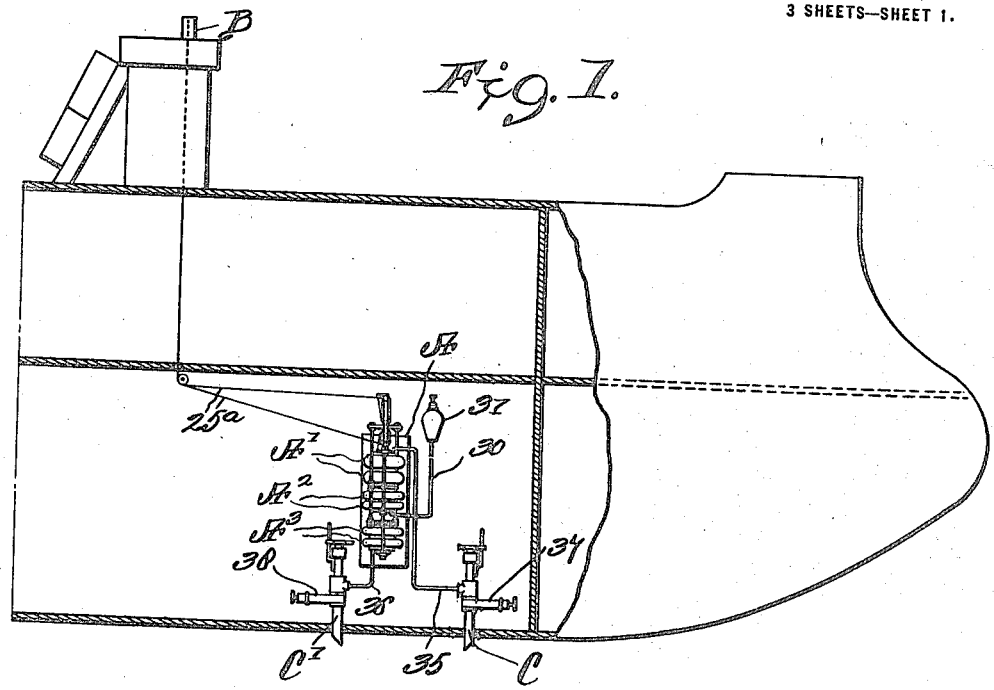
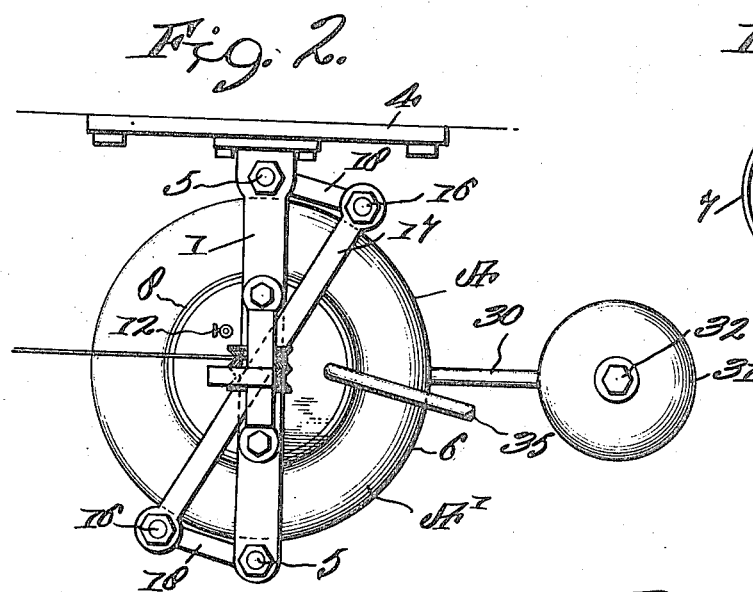
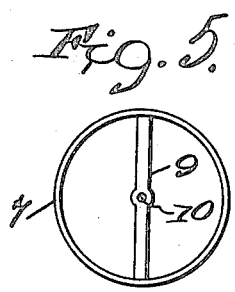
Witnesses
Edwin J Beller
R. J. McWhinney
Inventor
Richard Star
by Wilkinson, Giusta & McKays
Attorneys

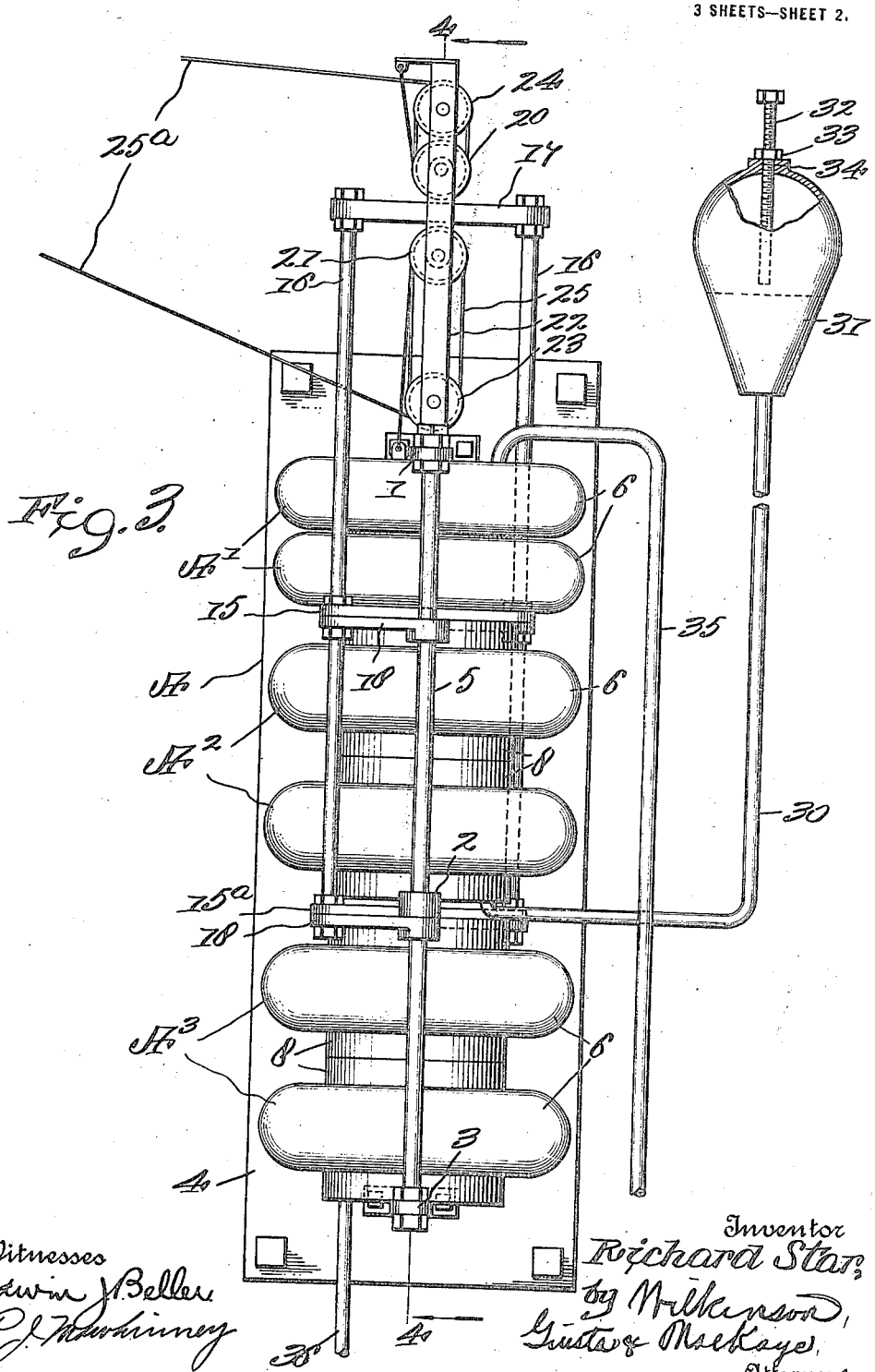

R. STAR.
APPARATUS FOR INDICATING THE SPEED OF SHIPS.
APPLICATION FILED AUG. 7, 1916.

1,239,978.

Patented Sept. 11, 1917.
3 SHEETS—SHEET 3.

Witnesses
Edwin Beller.
P. J. MacKinney.

Inventor
Richard Star,
by Wilkinson,
Gustaf MacKaye,
Attorneys.

UNITED STATES PATENT OFFICE.

RICHARD STAR, OF NEWPORT, RHODE ISLAND.

APPARATUS FOR INDICATING THE SPEED OF SHIPS.

1,239,978.

Specification of Letters Patent. Patented Sept. 11, 1917.

Application filed August 7, 1916. Serial No. 113,597.

*To all whom it may concern:*

Be it known that I, RICHARD STAR, a citizen of the United States, residing at Newport, in the county of Newport and State of Rhode Island, have invented certain new and useful Improvements in Apparatus for Indicating the Speed of Ships; and I do hereby declare the following to be a full, clear, and exact description of the invention, such as will enable others skilled in the art to which it appertains to make and use the same.

My present invention relates to improvements in apparatus for indicating the speed of ships, and it is especially intended to provide improvements in the apparatus illustrated and described in my Patents Nos. 955,008, granted April 12, 1910; 988,832, granted April 4, 1911; 1,052,387 granted February 4, 1913; and in my application filed June 21, 1915, Serial No. 35412, and renewed February 28, 1916, serial No. 81060, all of said patents and said applications being entitled Apparatus for indicating the speed of ships.

My present invention is more especially intended to provide improvements over the apparatus shown in my patent aforesaid, No. 1,052,387, and in the application just referred to.

My invention will be more clearly understood by reference to the accompanying drawings, in which corresponding parts are indicated by corresponding reference symbols throughout the several views:

Figure 1 is a side elevation of the forward portion of a ship, partly broken away, and shows the apparatus diagrammatically and in side elevation, the inlet pressure pipes and the suction pipes being shown on exaggerated scale for the sake of clearness in the drawings.

Fig. 2 is a plan view of the actuator and connected parts.

Fig. 3 is a front elevation of the actuator.

Fig. 5 is a detail showing one of the removable rings used in the actuator.

Figure 4:
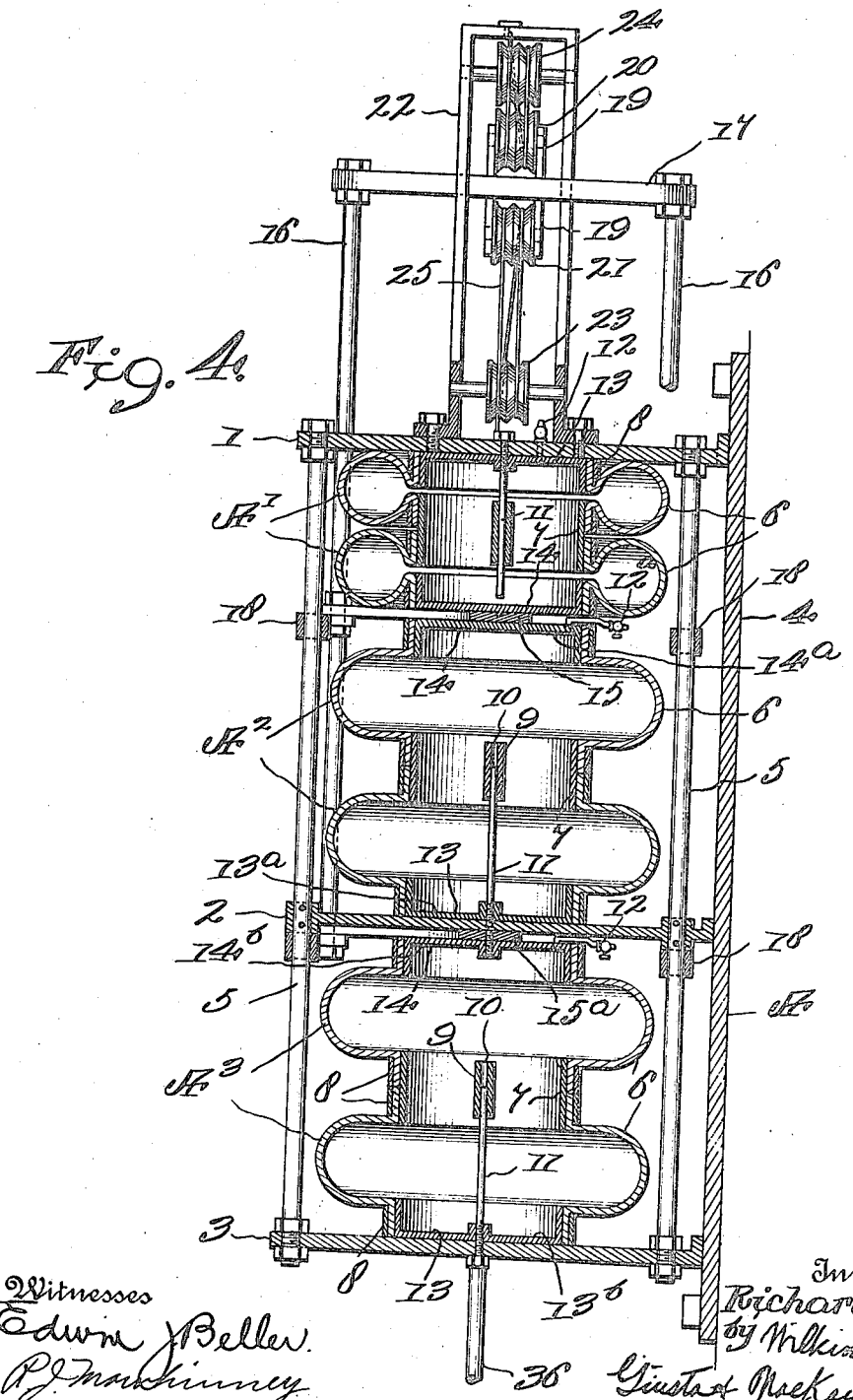
Fig. 4 is a section through Fig. 3 along the line 4—4, and looking in the direction of the arrows.

The apparatus consists primarily of an actuator A, comprising a series of superposed collapsible chambers A′, A² and A³, with means for applying pressure, due to the speed of the ship through the water, to one of said collapsible chambers and for applying suction to another of said collapsible chambers; the combined result of the pressure and suction acting upon the intermediate chamber filled with liquid, whereby the head of this intermediate chamber is pressed downward, causing the expulsion of part of the liquid contained therein, against hydraulic or pneumatic pressure, adapted to restore the head to the initial position; and the movement of this head is transmitted by suitable wires and pulleys to one or more indicators B located at the bridge or other convenient point or points on the ship.

The liquid pressure is applied to the pressure chamber A′ of the actuator through the pressure pipe C, opening through the hull of the vessel, and the suction is applied to the suction chamber by means of the suction pipe C′, see Fig. 1.

The construction of the indicator B and of the pipes C and C′ and their connections, is fully described in my prior patents aforesaid, and not being a part of my present invention will be only briefly referred to herein.

My present invention relates more particularly to the construction and operation of the actuator, and of the means of balancing the fluid pressure in the intermediate or liquid containing chamber A² thereof.

The actuator is provided with a stationary frame comprising the fixed brackets 1, 2 and 3, secured to any suitable fixed support 4 on the vessel. These brackets are connected together by the tie rods 5, and the brackets and the tie rods form a fixed frame in which the several chambers A′, A² and A³ are mounted.

Each collapsible chamber consists of a series of collapsible diaphragms 6, the folds of which are separated by the guide rings 7, and exterior to which are the retaining rings 8, see Figs. 4 and 5. The guide rings are preferably provided with a web 9, see Figs. 4 and 5, perforated as at 10 to receive the guide rods 11, whereby the ring is caused to move in a vertical direction as the chamber expands or collapses. The expansible diaphragm 6 may be made of rubber, leather, water-proof canvas, or other suitable material which is air-and water tight.

Each collapsible chamber is provided with a suitable pet cock 12. Each collapsible chamber of the actuator is provided with a fixed cup-shaped head and with a similar movable head opposite the same, the fixed head of the pressure chamber being indicated at 13 and the movable head at 14; the fixed head of the intermediate or liquid chamber being indicated at 13ᵃ and the movable head at 14ᵃ; and the fixed head of the lower or suction chamber being indicated by 13ᵇ and the movable head by 14ᵇ.

The movable heads 14 and 14ᵃ are connected by the cross head 15, and the movable head 14ᵇ is connected to the cross head 15ᵃ. These two cross heads 15 and 15ᵃ are rigidly attached to the sliding rods 16, which are connected at their upper ends by the cross head 17. The rods 16 pass through suitable guide arms 18, see Figs. 2 and 3, which are mounted on the tie rods 5. The cross head 17 carries a bracket 19 in which the pulleys 20 and 21 are journaled. These pulleys preferably contain two or more sheaves, so as to multiply the movement of the cross head 17.

Secured to the fixed bracket 1, or other convenient part of the frame, I provide a U-frame 22, in which the pulleys 23 and 24 are journaled. The wire 25 passes over these several pulleys, as shown more clearly in Figs. 3 and 4, and the bight 25ᵃ of the wire is carried over suitable fair leaders to the indicator B, as shown diagrammatically in Fig. 1.

The intermediate, or liquid chamber A² is filled with liquid to the desired height through the stand pipe 30, which is preferably provided at its upper end with an air chamber 31, the air chamber being closed by a screw 32 which may be set to the desired relation by the lock nut 33. The capacity of the chamber may be varied for adjusting purposes by screwing up, or down on the screw 32, thus affording a nice adjustment to the balance column of liquid, as will be hereinafter more fully described. In order to supply liquid to the liquid chamber A², the screw 32 is removed, and liquid supplied through the screw hole 34 in the chamber 31.

The hydraulic pressure, due to the ship moving through the water, is transmitted through the pipe C and the pipe 35 to the upper end of the pressure chamber A′, and suction is applied to the suction chamber A³ by means of the pipe C′ and suction pipe 36, see Figs. 1 and 3.

The operation of the device is as follows:
The liquid chamber A² is supplied with liquid until the movable head 14ᵃ is raised to the desired position, which will be shown by the indicator at B, the liquid being poured through the hole 34. The upper part of the chamber 31 is then occupied by air under atmospheric pressure, and the screw 32 is secured in place and locked by the lock nut 33. The pressure of the liquid in the chamber A² will be balanced by the weight of the movable parts, movable heads, cross heads, diaphragms, rods 16, rings 7 and 8, pulleys 20 and 21, etc., and assuming the valves 37 and 38 to be opened, the parts of the actuator would be in the position shown in Fig. 4, which would correspond to the normal position when the apparatus is not in operation, or when the ship is at a standstill.

Now, to put the apparatus in operation, the valves 37 and 38 are opened and the pipes C and C′ are pushed out to cause pressure and suction respectively. All the air having been let out of all the collapsible chambers and all the pet cocks 12 closed, the water flowing up through the pipe under pressure will enter the pressure chamber A′, and at the same time the suction created in the pipe 36 will create a suction in the lower chamber A³; the result will be that the movable head 14ᵃ of the liquid chamber A² will be pressed down by the pressure of the water, and the head 14ᵇ of the suction chamber will be sucked down by the suction, causing a combined pull on the rods 16, and causing the wire to reeve over the pulleys and to actuate the indicator.

As the head 14ᵃ of the liquid chamber A² is drawn down, some of the water therein will be forced through the pipe 30 up into the air chamber 31, compressing the air therein; so that, as the head 14ᵃ continues to move downward, the air will be more and more compressed in the air chamber 31 until equilibrium is reached. There would obviously be a braking effect incident to the forcing of the liquid from the liquid chamber A² through this pipe 30, which would be dependent upon the cross section of said pipe, and for quick action the pipe should be made large, while for delayed action the pipe may be made small.

The size of the air chamber might be varied to suit varying conditions of speed, or varying size of the actuators. Moreover, the balancing pressure required in the air chamber would obviously depend, in a large measure, upon the height of the column of liquid beneath the same.

Any suitable liquid may be used in the chamber A² and the stand pipe 30, such, for instance, as water, glycerin and water, non-volatile oil, or any other suitable liquid. It will be preferable to use oil or other liquid than water, so that leakage from the liquid chamber might be more readily detected.

It will be obvious that as the speed of the ship increases, the pressure in the chamber A′ will increase, and also the suction in the suction chamber; while as the speed falls, the reverse effect will follow.

When it is desired to throw the apparatus out of operation, the pipes C and C′ are pulled in and valves 37 and 38 are closed; all the pet cocks remain closed, once the air has been let out, and are not to be touched when in or out of operation. The pet cock 12ª of the liquid chamber A² is provided to permit the escape of air when the liquid is being admitted thereto, and should normally remain closed.

It will be noted that the downward pressure of the parts supported by the movable head 14ª of the liquid chamber, will be balanced by the pressure in the stand pipe 30.

It will be seen that I provide an apparatus entirely controlled by hydraulic or pneumatic pressure, which is extremely sensitive to variations caused by change of the ship's speed, and which apparatus may be readily adjusted by increasing or decreasing the air space in the air chamber 31.

It will be noted that the apparatus may be made more sensitive by increasing the size of the stand pipe 30, and by enlarging the air chamber 31; and, vice versa, if more sluggish action is desired, the stand pipe and air chamber may be made smaller; or the air chamber may be done away with and a taller stand pipe used.

If desired, air under pressure may be forced into the air chamber after the same is closed, whereby the height of the liquid in the column 30 may be materially lessened.

It will be noted that the suction chamber may be done away with, and the connections between the same and the water of flotation may be omitted in which event the apparatus will operate under the action of the pressure chamber only.

I do not mean to limit this invention to any particular means of transmitting to the indicator the movement of the movable head of the liquid chamber; as various means for accomplishing this result, either by mechanical, electrical, hydraulic, or pneumatic means, may be applied to accomplish a similar result.

It will be obvious that various modifications might be made in the herein described apparatus and in the construction, combination and arrangement of parts which could be used without departing from the spirit of my invention.

Having thus described my invention, what I claim and desire to secure by Letters Patent of the United States, is:

1. In an apparatus of the character described the combination with an indicator, of means for controlling the same comprising an actuator composed of three superposed expansible chambers, that is a pressure chamber, a suction chamber, and an intermediate chamber charged with liquid and provided with a movable head, an inlet pipe opening into said pressure chamber and communicating with the water of flotation, a suction pipe opening into said suction chamber and also communicating with the water of flotation, and a stand pipe adapted to contain a column of liquid connected to said liquid chamber, for balancing the pressure on said movable head, substantially as described.

2. In an apparatus of the character described the combination with an indicator, of means for controlling the same comprising an actuator composed of three superposed expansible chambers, that is a pressure chamber, a suction chamber, and an intermediate chamber charged with liquid and provided with a movable head, an inlet pipe opening into said pressure chamber and communicating with the water of flotation, a suction pipe opening into said suction chamber and also communicating with the water of flotation, and a stand pipe adapted to contain a column of liquid connected to said liquid chamber, with a closed air chamber connected to said stand pipe, for balancing the pressure on said movable head, substantially as described.

3. In an apparatus of the character described the combination with an indicator, of means for controlling the same comprising an actuator composed of three superposed expansible chambers, that is a pressure chamber, a suction chamber, and an intermediate chamber charged with liquid and provided with a movable head, an inlet pipe opening into said pressure chamber and communicating with the water of flotation, a suction pipe communicating with the water of flotation, and a stand pipe adapted to contain a column of liquid connected to said liquid chamber, with a closed air chamber connected to said stand pipe, for balancing the pressure on said movable head, and means for adjusting the pressure of the air in said air chamber, substantially as described.

4. In an apparatus of the character described the combination with an indicator, of means for controlling the same comprising an actuator composed of three superposed expansible chambers, that is a pressure chamber, a suction chamber, and an intermediate chamber charged with liquid and provided with a movable head, means for transmitting the movement of said head to said indicator, an inlet pipe opening into said pressure chamber and communicating with the water of flotation, a suction pipe opening into said suction chamber and also communicating with the water of flotation, and a stand pipe adapted to contain a column of liquid connected to said liquid chamber, for balancing the pressure on said movable head, substantially as described.

5. In an apparatus of the character described the combination with an indicator, of means for controlling the same comprising an actuator composed of three superposed expansible chambers, that is a pressure chamber, a suction chamber, and an intermediate chamber charged with liquid and provided with a movable head, means for transmitting the movement of said head to said indicator, an inlet pipe opening into said pressure chamber and communicating with the water of flotation, a suction pipe opening into said suction chamber and also communicating with the water of flotation, and a stand pipe adapted to contain a column of liquid connected to said liquid chamber, with a closed air chamber connected to said stand pipe, for balancing the pressure on said movable head, substantially as described.

6. In an apparatus of the character described the combination with an indicator, of means for controlling the same comprising an actuator composed of two superposed expansible chambers, that is a pressure chamber, and a chamber charged with liquid and provided with a movable head, an inlet pipe opening into said pressure chamber and communicating with the water of flotation, and a stand pipe adapted to contain a column of liquid connected to said liquid chamber for balancing the pressure on said movable head, substantially as described.

7. In an apparatus of the character described the combination with an indicator, of means for controlling the same comprising an actuator composed of two superposed expansible chambers, that is a pressure chamber, and a chamber charged with liquid and provided with a movable head, an inlet pipe opening into said pressure chamber and communicating with the water or flotation, and a stand pipe adapted to contain a column of liquid connected to said liquid chamber, with a closed air chamber connected to said stand pipe, for balancing the pressure on said movable head, substantially as described.

8. In an apparatus of the character described the combination with an indicator, of means for controlling the same comprising an actuator composed of two superposed expansible chambers, that is a pressure chamber, and a chamber charged with liquid and provided with a movable head, means for transmitting the movement of said head to said indicator, an inlet pipe opening into said pressure and communicating with the water of flotation, and a stand pipe adapted to contain a column of liquid connected to said liquid chamber, for balancing the pressure on said movable head, substantially as described.

9. In an apparatus of the character described the combination with an indicator, of means for controlling the same comprising an actuator composed of two superposed expansible chambers, that is a pressure chamber, and a chamber charged with liquid and provided with a movable head, means for transmitting the movement of said head to said indicator, an inlet pipe opening into said pressure chamber and communicating with the water of flotation, and a stand pipe adapted to contain a column of liquid connected to said liquid chamber, with a closed air chamber connected to said stand pipe, for balancing the pressure on said movable head, substantially as described.

10. In an apparatus of the character described the combination with an indicator, of means for controlling the same comprising an actuator composed of three superposed expansible chambers, that is a pressure chamber, a suction chamber, and an intermediate chamber charged with liquid each chamber being provided with a fixed and a movable head, with connections between the movable heads of the several chambers whereby they are caused to move simultaneously, an inlet pipe opening into said pressure chamber and communicating with the water of flotation, a suction pipe opening into said suction chamber and also communicating with the water of flotation, and a stand pipe adapted to contain a column of liquid connected to said liquid chamber, for balancing the pressure on said movable heads, substantially as described.

11. In an apparatus of the character described the combination with an indicator, of means for controlling the same comprising an actuator composed of three superposed expansible chambers, that is a pressure chamber, a suction chamber, and an intermediate chamber charged with liquid, each chamber being provided with a fixed and a movable head, with connections between the movable heads of the several chambers whereby they are caused to move simultaneously, an inlet pipe opening into said pressure chamber and communicating with the water of flotation, a suction pipe opening into said suction chamber and also communicating with the water of flotation, and a stand pipe adapted to contain a column of liquid connected to said liquid chamber, with a closed air chamber connected to said stand pipe, for balancing the pressure on said movable heads, substantially as described.

12. In an apparatus of the character described the combination with an indicator, of means for controlling the same comprising an actuator composed of three superposed expansible chambers, that is a pressure chamber, a suction chamber, and an intermediate chamber charged with liquid each chamber being provided with a fixed and a movable head, with connections between the movable heads of the several chambers whereby they are caused to move simultaneously, means for transmitting the movement of said heads to said indicator, an inlet pipe opening into said pressure chamber and communicating with the water of flotation, a suction pipe opening into said suction chamber and also communicating with the water of flotation, and a stand pipe adapted to contain a column of liquid connected to said liquid chamber, for balancing the pressure on said movable heads, substantially as described.

13. In an apparatus of the character described the combination with an indicator, of means for controlling the same comprising an actuator composed of three superposed expansible chambers, that is a pressure chamber, a suction chamber, and an intermediate chamber charged with liquid, each chamber being provided with a fixed and a movable head, with connections between the movable heads of the several chambers whereby they are caused to move simultaneously, means for transmitting the movement of said heads to said indicator, an inlet pipe opening into said pressure chamber and communicating with the water of flotation, a suction pipe opening into said suction chamber and also communicating with the water of flotation, and a stand pipe adapted to contain a column of liquid connected to said liquid chamber, with a closed air chamber connected to said stand pipe, for balancing the pressure on said movable heads, substantially as described.

14. In an apparatus of the character described the combination with an indicator, of means for controlling the same comprising an actuator composed of two superposed expansible chambers, that is a pressure chamber, and a chamber charged with liquid, each chamber being provided with a fixed and a movable head, with connections between said movable heads whereby they are caused to move simultaneously, an inlet pipe opening into said pressure chamber and communicating with the water of flotation, and a stand pipe adapted to contain a column of liquid connected to said liquid chamber, for balancing the pressure on said movable heads, substantially as described.

15. In an apparatus of the character described the combination with an indicator, of means for controlling the same comprising an actuator composed of two superposed expansible chambers, that is a pressure chamber, and a chamber charged with liquid each chamber being provided with a fixed and a movable head, with connections between said movable heads whereby they are caused to move simultaneously, an inlet pipe opening into said pressure chamber and communicating with the water of flotation, and a stand pipe adapted to contain a column of liquid connected to said liquid chamber, with a closed air chamber connected to said stand pipe, for balancing the pressure on said movable heads, substantially as described.

16. In an apparatus of the character described the combination with an indicator, of means for controlling the same comprising an actuator composed of two superposed expansible chambers, that is a pressure chamber, and a chamber charged with liquid each chamber being provided with a fixed and a movable head, with connections between said movable heads whereby they are caused to move simultaneously, with means for transmitting the movement of said movable heads to said indicator, an inlet pipe opening into said pressure chamber and communicating with the water of flotation, and a stand pipe adapted to contain a column of liquid connected to said liquid chamber, for balancing the pressure on said movable heads, substantially as described.

17. In an apparatus of the character described the combination with an indicator, of means for controlling the same comprising an actuator composed of two superposed expansible chambers, that is a pressure chamber, and a chamber charged with liquid each chamber being provided with a fixed and a movable head, with connections between said movable heads whereby they are caused to move simultaneously, with means for transmitting the movement of said movable heads to said indicator, an inlet pipe opening into said pressure chamber and communicating with the water of flotation, and a stand pipe adapted to contain a column of liquid connected to said liquid chamber, with a closed air chamber connected to said stand pipe, for balancing the pressure on said movable heads, substantially as described.

In testimony whereof, I affix my signature.

RICHARD STAR.